United States Patent
Draina et al.

(10) Patent No.: US 11,522,403 B2
(45) Date of Patent: Dec. 6, 2022

(54) GENERATOR FIELD ENDWINDING BLOCKING

(71) Applicant: GENERAL ELECTRIC COMPANY, Schenectady, NY (US)

(72) Inventors: Kevin Mitchell Draina, Ballston Spa, NY (US); Anthony Rigosu, Altamont, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 45 days.

(21) Appl. No.: 17/237,710

(22) Filed: Apr. 22, 2021

(65) Prior Publication Data

US 2022/0344998 A1 Oct. 27, 2022

(51) Int. Cl.
*H02K 3/51* (2006.01)
*H02K 3/24* (2006.01)

(52) U.S. Cl.
CPC ...................... *H02K 3/51* (2013.01)

(58) Field of Classification Search
CPC .. H02K 3/00; H02K 3/22; H02K 3/24; H02K 3/51
USPC ................................. 310/270–271
See application file for complete search history.

(56) References Cited

U.S. PATENT DOCUMENTS

| 3,427,488 A | 2/1969 | Terry, Jr. |
| 4,091,301 A | 5/1978 | Blank |
| 4,656,382 A | 4/1987 | Moore et al. |
| 5,986,380 A | 11/1999 | Kaminski et al. |
| 6,194,807 B1 | 2/2001 | Kaminski et al. |
| 6,313,561 B1 | 11/2001 | Nygard et al. |
| 6,486,575 B2 | 11/2002 | Miller |
| 7,939,977 B2 * | 5/2011 | Hattori ...................... H02K 3/51 310/58 |
| 2003/0042818 A1 * | 3/2003 | Tornquist ................. H02K 1/24 310/91 |

FOREIGN PATENT DOCUMENTS

JP 2015035901 * 2/2015 ............... H02K 3/24

OTHER PUBLICATIONS

DJ Albright, DR Albright, Generatortech, Inc., Generator Field Winding Shorted Turns: Observed Conditions and Causes, AGT Services, pp. 1-11.
Extended EP Search Report issued in corresponding EP 22168142.2 dated Sep. 9, 2022.

* cited by examiner

*Primary Examiner* — Tran N Nguyen
(74) *Attorney, Agent, or Firm* — Grogan, Tuccillo & Vanderleeden, LLP

(57) ABSTRACT

Generator field endwinding blocking is described. The endwinding blocking has a spacer block for radial placement between rotor endwindings. The spacer block has a spacer body with a radially inboard end, a radially outboard end, a slot extending from the outboard end towards the inboard end, and at least one transverse hole formed on an outer surface of the spacer body, extending in a perpendicular direction towards the slot. A cap covers at least a portion of the outboard end. The cap has a radially inward portion received in the slot with at least one hole aligned with the at least one traverse hole, and at least one end extending beyond a periphery of the outboard end towards an adjacent endwinding. A fastener placed in the holes of the spacer block and the radially inward portion of the cap, secures the cap with the spacer block.

20 Claims, 5 Drawing Sheets

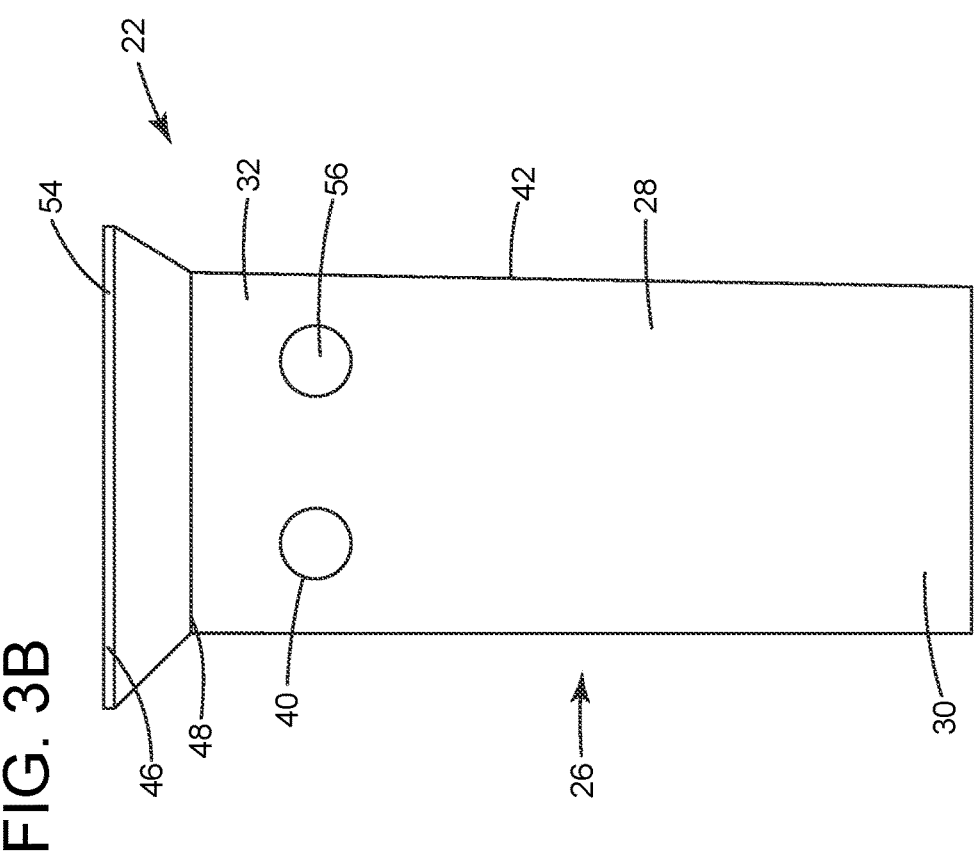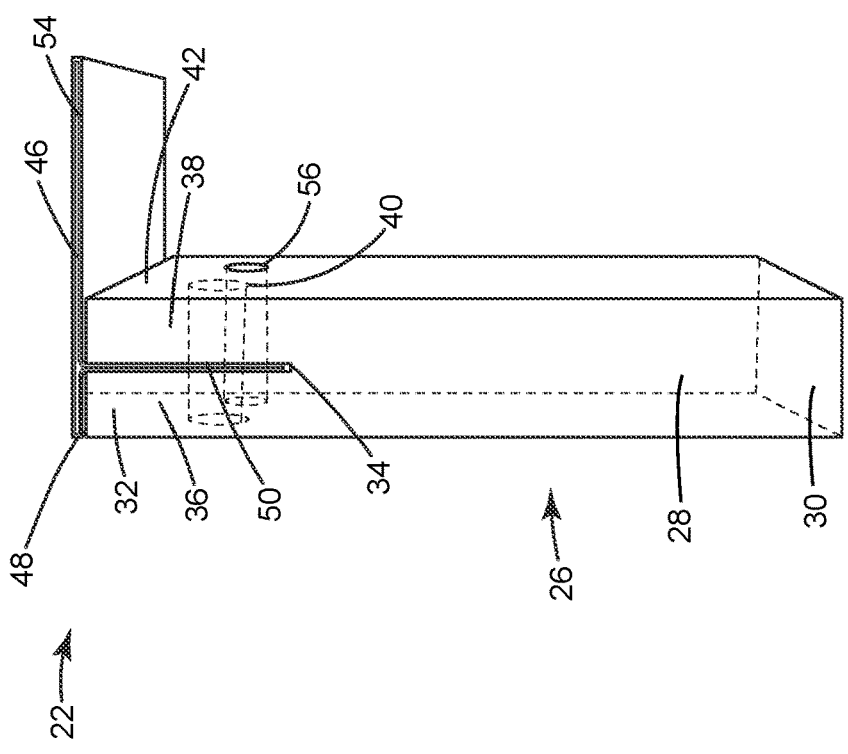

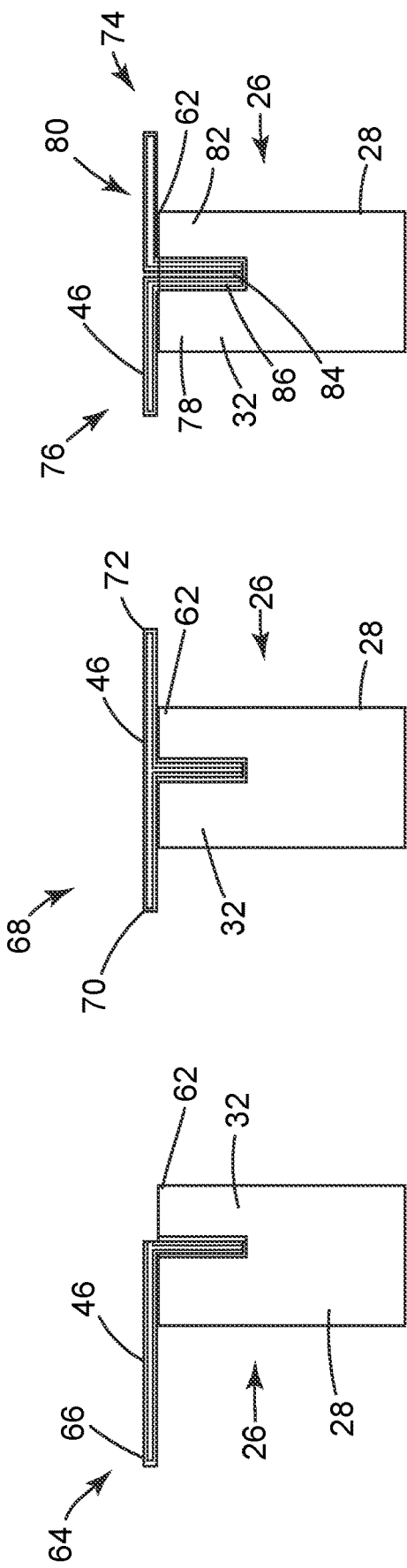

GENERATOR FIELD ENDWINDING BLOCKING

BACKGROUND

Technical Field

Embodiments of this disclosure relate generally to generator rotors and, more specifically, to the blocking of endwinding coils of field windings of generator rotors.

Discussion of Art

The endwinding coils of the field windings of a dynamoelectric machine, such as, for example, a generator rotor, are typically spaced with insulating blocking. This blocking retains the integrity of the coil stacks, transfers lateral and circumferential thermal expansion loads, and provides space for ventilation, among other features. Correct alignment and position of the blocking is necessary for proper functioning of the generator field windings. During both assembly and service of the generator rotor, the blocking can experience significant loading (e.g., force due to assembly of all components, crushing from retaining ring assembly, turning gear cyclic gravity loading, centrifugal loading at 3000-6000 g, thermal expansion loading, etc.). The retention mechanism that holds the blocking in place must be able to handle all of these loads; otherwise the blocking can become loose and shift position.

Existing retention mechanisms for blocking tend to be very expensive to manufacture and install due to complexity in the assembly on the rotor. Further, these retention mechanisms have durability issues due to the loading that the blocking can experience during assembly and service of the generator rotor. An example of one of these existing retention mechanisms can include the use of rivets affixed to the top of the blocking. Specific drawbacks with the use of the rivets include the rivets shearing part of the blocking, inability of the rivets to withstand load, and the rivets tendency to become easily damaged during installation due to forces and strikes. Other retention mechanisms such as the use of tie rods and felt have their own unique issues making them undesirable in certain scenarios.

BRIEF DESCRIPTION

The following presents a simplified summary of the disclosed subject matter in order to provide a basic understanding of some aspects of the various embodiments described herein. This summary is not an extensive overview of the various embodiments. It is not intended to exclusively identify key features or essential features of the claimed subject matter set forth in the Claims, nor is it intended as an aid in determining the scope of the claimed subject matter. Its sole purpose is to present some concepts of the disclosure in a streamlined form as a prelude to the more detailed description that is presented later.

The various embodiments are directed to providing solutions that overcome the deficiencies associated with the existing retention mechanisms used to hold in place the blocking deployed in a generator rotor. In particular, the various embodiments utilize a semi-flexible, durable sheet of material that is affixed within a slot formed in the blocking, that extends out from the slot and over a portion of a top surface of the blocking, where it is pinched between the coils and insulation of a retaining ring that is fitted over the endwinding coils. This semi-flexible, durable sheet of material, referred to as a cap, can be folded to take on a shape that fits in the slot such that there is at least one end that can extend beyond a periphery of the top surface of the blocking towards the endwinding coils. The shape of the sheet of material can include a "T" shape, an "L" shape, or a "dual" cap shape where two "L" shaped-caps are fitted into the slot back to back, such that one of the "L" shaped-caps extends out and beyond one end of a top surface of the blocking with the other "L" shaped-cap extending out and beyond an opposing end of the top surface of the blocking. The portion of the cap that is inserted into the slot can have at least one hole that aligns with at least one transverse hole formed on an outer surface of the blocking that extends in a perpendicular direction towards the slot.

A fastener, such as, for example, a pin, is placed in the at least one transverse hole of the blocking and the at least one hole in the portion of the cap in the slot, securing the cap with the blocking. To this extent, there is a vertical engagement between the blocking and the cap, and a horizontal engagement block between the cap and the endwindings. This vertical engagement and horizontal engagement lock the blocking, the cap, and the fastener together. As a result, the contact area of the cap to retention can be significantly increased, thus increasing the tear load to pull the cap out. Further, affixing the cap within the slot, as opposed to the top surface of the blocking, makes the design of the various embodiments less prone to becoming easily damaged during assembly.

The various embodiments have several benefits over the existing retention mechanisms such as those that use rivets to hold in place the blocking deployed in a generator rotor. First, the retention mechanism of the various embodiments is much more durable against hammer blows or any impact on the top of the blocking which can happen during installation. Second, the retention mechanism of the various embodiments has a higher shear/tear strength from lateral loads seen in service of the generator rotor. Third, the assembly of the retention mechanism of the various embodiments can be made of entirely non-metallic components which is beneficial as any loose metallic components can cause electrical shorting in a generator field winding. As a result of these benefits, the solution offered by the various embodiments is cost effective and robust to assembly and operational loading.

In one embodiment, a rotor endwinding blocking member is provided. The rotor endwinding blocking member comprises: a spacer block adapted for radial placement between rotor endwindings disposed on a generator rotor, the spacer block including a spacer body having a radially inboard end, a radially outboard end, a slot extending radially inward a predetermined distance from the radially outboard end towards the radially inboard end, and at least one transverse hole formed on an outer surface of the spacer body, extending in a perpendicular direction towards the slot; a cap that covers at least a portion of a top surface of the radially outboard end of the spacer body of the spacer block, the cap having a radially inward portion received in the slot of the spacer body of the spacer block with at least one hole formed therein aligned with the at least one transverse hole formed on the outer surface of the spacer body of the spacer block, and at least one end extending beyond a periphery of the radially outboard end of the spacer body of the spacer block towards an adjacent endwinding; and a fastener placed in the at least one transverse hole of the spacer body of the spacer block and the at least one hole in the radially inward portion of the cap, securing the cap with the spacer body of the spacer block.

In another embodiment, a generator rotor is provided. The generator rotor comprises: a rotor body having a plurality of axially oriented slots extending radially outward from a center of the rotor body; a plurality of field windings disposed in the slots, wherein the plurality of field windings include longitudinally oriented central windings secured with the slots and turns of endwindings extending out unsecured from the slots; an arrangement of blocking members radially disposed between the turns of endwindings to restrain the endwindings from relative longitudinal movement, each blocking member including: a spacer block having a spacer body with a radially inboard end, a radially outboard end, a slot extending radially inward a predetermined distance from the radially outboard end towards the radially inboard end to form a first outboard end region and a second outboard end region, the slot separating the first outboard end region from the second outboard end region, and at least one transverse hole formed on a surface of both the first outboard end region and the second outboard end region, the at least one transverse hole of both the first outboard end region and the second outboard end region extending in a perpendicular direction towards the slot; a cap that covers at least a portion of a top surface of the radially outboard end of the spacer block, the cap having a radially inward portion received in the slot of the spacer block with at least one hole formed therein aligned with the at least one transverse hole formed on the outer surface of both the first outboard end region and the second outboard end region of the spacer block, and at least one end extending beyond a periphery of the top surface of the radially outboard end of the spacer block towards an adjacent endwinding; and a fastener placed in the at least one transverse hole of both the first outboard end region and the second outboard end region of the spacer block and the at least one hole in the radially inward portion of the cap, securing the cap with the spacer body of the spacer block, wherein there is a vertical engagement between the spacer body of the spacer block and the cap, and a horizontal engagement between the cap and the adjacent endwinding; and a retaining ring fitted over the arrangement of blocking members to restrain the endwindings from radial outward movement.

In yet another embodiment, a method of servicing a generator rotor having a rotor body with a plurality of axially oriented slots extending radially outward from a center of the rotor body and a plurality of field windings having longitudinally oriented central windings secured with the slots and turns of endwindings extending out unsecured from the slots is provided. The method comprises: modifying or retrofitting the generator rotor with an arrangement of blocking members radially disposed between the turns of endwindings to restrain the endwindings from relative longitudinal movement, each blocking member including: a spacer block having a spacer body with a radially inboard end, a radially outboard end, a slot extending radially inward a predetermined distance from the radially outboard end towards the radially inboard end to form a first outboard end region and a second outboard end region, the slot separating the first outboard end region from the second outboard end region, and at least one transverse hole formed on a surface of both the first outboard end region and the second outboard end region, the at least one transverse hole of both the first outboard end region and the second outboard end region extending in a perpendicular direction towards the slot; a cap that covers at least a portion of a top surface of the radially outboard end of the spacer block, the cap having a radially inward portion received in the slot of the spacer block with at least one hole formed therein aligned with the at least one transverse hole formed on the outer surface of both the first outboard end region and the second outboard end region of the spacer block, and at least one end extending beyond a periphery of the top surface of the radially outboard end of the spacer block towards an adjacent endwinding; and a fastener placed in the at least one transverse hole of both the first outboard end region and the second outboard end region of the spacer block and the at least one hole in the radially inward portion of the cap, securing the cap with the spacer body of the spacer block, wherein there is a vertical engagement between the spacer body of the spacer block.

DRAWINGS

The present invention will be better understood from reading the following description of non-limiting embodiments, with reference to the attached drawings, wherein below:

FIG. 3A and FIG. 3B show a side view and front view, respectively, of an endwinding blocking member according to an embodiment of the present invention;

FIGS. 7A-7C show schematics of endwinding blocking members according to various embodiments of the present invention.

DETAILED DESCRIPTION

Example embodiments of the present invention will be described more fully hereinafter with reference to the accompanying drawings, in which some, but not all embodiments are shown. Indeed, the present invention may be embodied in many different forms and should not be construed as limited to the embodiments set forth herein; rather, these embodiments are provided so that this disclosure will satisfy applicable legal requirements. For Like numbers may refer to like elements throughout.

Figure 1:
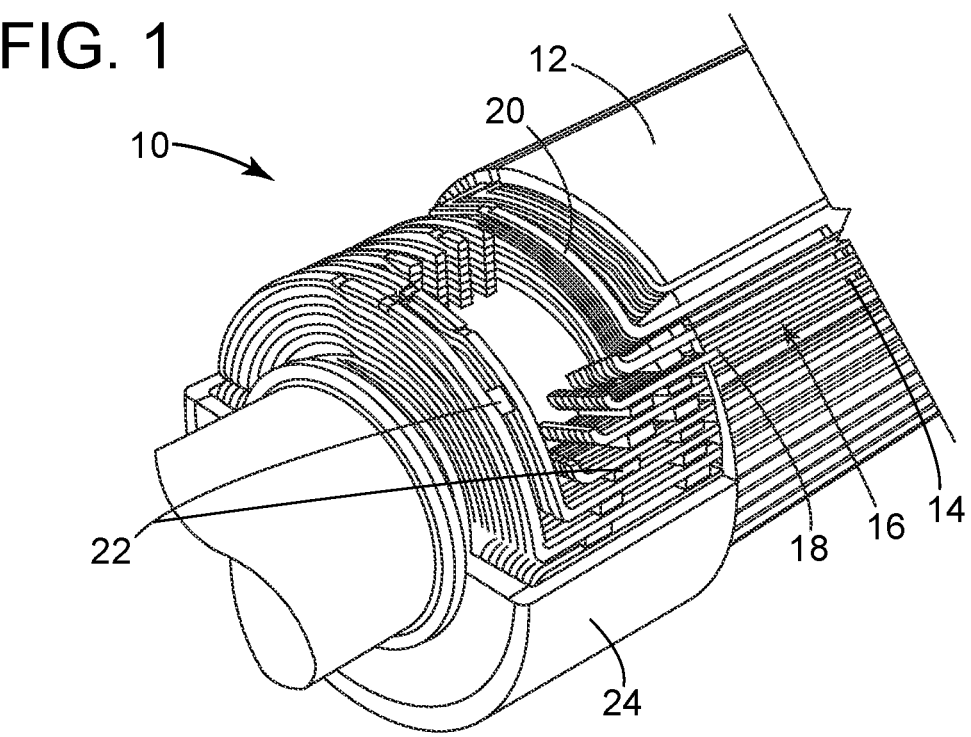
FIG. 1 is a perspective view of a generator rotor with a partial cutaway showing field windings including longitudinally oriented central windings and turns of endwindings, and an arrangement of endwinding blocking members to restrain the endwindings from relative longitudinal movement according to an embodiment of the present invention.
Figure 2:
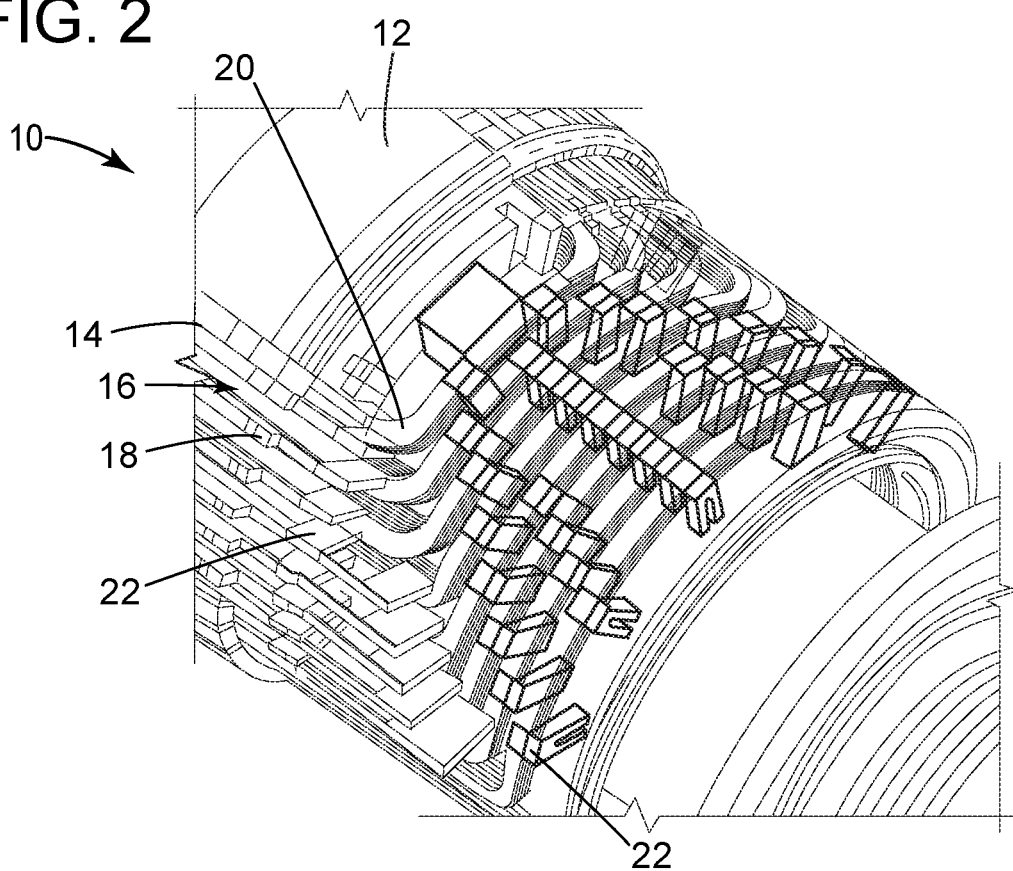
FIG. 2 is a top perspective view of a generator rotor with a partial cutaway showing a more detailed view of an arrangement of the endwinding blocking members with the turns of endwindings according to an embodiment of the present invention.

Turning now to the figures, FIGS. 1 and 2 show differing views of a dynamoelectric machine, such as, a generator rotor 10 that can be used with steam and gas turbines. As shown in FIGS. 1 and 2, the generator rotor 10 includes a rotor body 12 having longitudinally or axially oriented slots 14 that can extend the length of the rotor body towards the axial ends of the rotor body 12, and extend radially outward from a center of the rotor body. Field windings 16, which can include, a series of coils, have segments disposed in the slots 14. In particular, the field windings 16 include longitudinally oriented central windings 18 that are secured within the slots 14, and turns of endwindings 20 that extend out unsecured from the slots circumferentially about the rotor body 12. To this extent, the central windings 18 can extend the length of the rotor body 12 towards the axial ends, and extend radially outward from the center of the rotor body, while the turns of endwindings 20, circumferentially spaced apart from each other, can extend circumferentially about the rotor body 12, and lie parallel to the rotor axis.

An arrangement of blocking members 22, which can also be referred to as rotor endwinding blocking members, are radially disposed between the turns of endwindings 20 to restrain the endwindings from relative longitudinal movement. The arrangement of blocking members 22 are shown sparingly in FIG. 1, while FIG. 2 shows the blocking members placed between the turns of endwindings 20 at more appropriate intervals, although it is understood that other arrangements of the blocking members are possible. An annular retaining ring 24, which is shown in FIG. 1, is fitted over the rotor body 12, including the arrangement of the blocking members 22, to restrain the endwindings from radial outward movement by centrifugal forces produced by the generator rotor 10.

It is understood that although FIGS. 1 and 2 show only one end of the generator rotor 10, the other end of the rotor body 12 can include a similar configuration of components. Further, it is understood that the generator rotor 10 described and depicted with respect to FIGS. 1 and 2 is for purposes of explaining the various embodiments of the present invention, and as a result, it is appreciated that the generator rotor 10 can include other components and parts.

FIG. 3A and FIG. 3B show a side view and a front view, respectively, of a rotor endwinding blocking member 22 according to an embodiment of the present invention. As shown in FIGS. 3A and 3B, the rotor endwinding blocking member 22 can include a spacer block 26 adapted for radial placement between the endwindings of a generator rotor (FIGS. 1 and 2). The spacer block 26 includes a spacer body 28 having a radially inboard end 30, a radially outboard end 32, a slot 34 extending radially inward a predetermined distance from the radially outboard end towards the radially inboard end. In one embodiment, the slot 34 forms a first outboard end region 36 and a second outboard end region 38.

Figure 4:
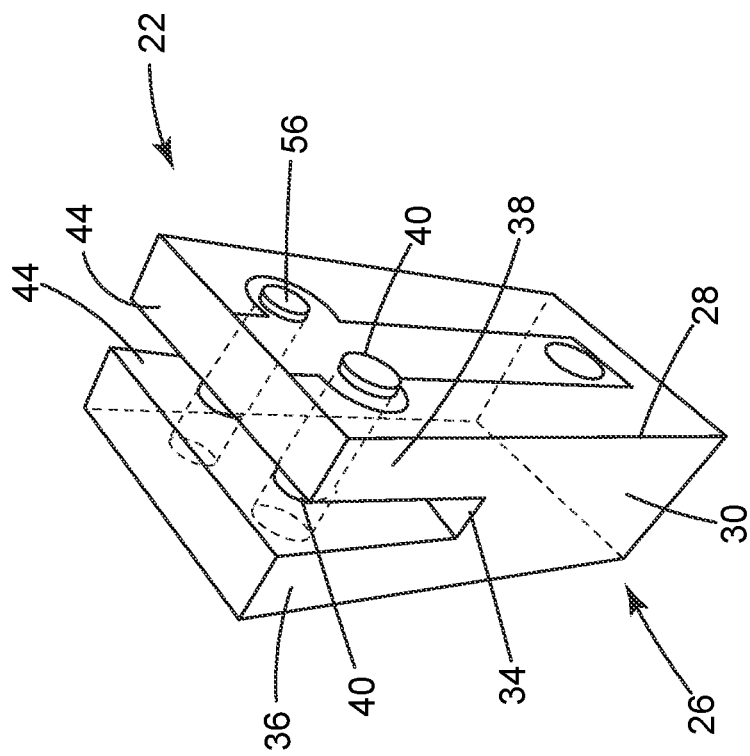
FIG. 4 shows an endwinding blocking member unassembled with all of it parts according to an embodiment of the present invention.

The spacer body 28 can further include at least one transverse hole 40 formed on an outer surface 42 of the spacer body that extends in a perpendicular direction towards the slot. In an embodiment, as shown in FIGS. 3A and 3B, the spacer body 28 can include two transverse holes 40 formed on the outer surface 42 of the spacer body 28. In an embodiment, as shown in FIG. 4, which shows the blocking member 22 unassembled with all of it parts, the transverse holes 40 can be formed on an outer surface 44 of both the first outboard end region 36 and the second outboard end region 38.

The spacer block 26 can be formed from a wide variety of insulating materials and shaped to have any of a number of different blocking shapes. In one embodiment, the spacer block 26 can include a glass material such as for example, a glass epoxy. Other examples of insulating material that are suitable for use with the spacer block include, but are not limited to, cloth, paper, or any non-metallic composite such as a dielectric. With regard to shapes, the spacer block 26 can be configured to a number of different blocking shapes that can vary by, for example, but not limited to, thickness, length, width, tapered walls, etc.

The spacer block 26 of the aforementioned insulating materials can be shaped to have the previously described features like the slot 34 and the at least one transverse hole 40 using any of a number of well-known processing techniques. For example, the slot 34 can be obtained by, but not limited to, milling, cutting or molding, while the at least one transverse hole 40 can be produced by, but not limited to, drilling, milling or molding.

Figure 5:
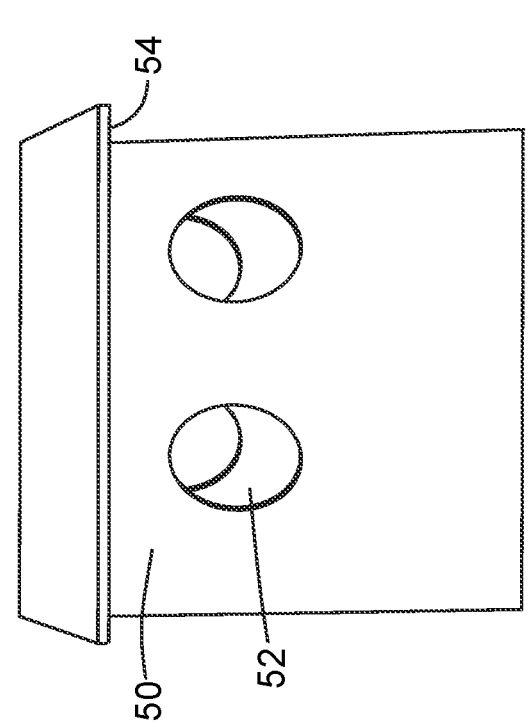
FIG. 5 shows a front view of a cap with at least one hole formed therein that forms a part of an endwinding blocking member prior to assembling with a spacer block according to an embodiment of the present invention.

Referring back again to FIGS. 3A and 3B, the endwinding blocking member 22 can further include a cap 46 that covers at least a portion of a top surface 48 of the radially outboard end 32 of the spacer block 26. The cap 46 can have a radially inward portion 50 that is received in the slot 34 of the spacer block 26. Although not shown in FIGS. 3A and 3B, the radially inward portion 50 of the cap 46 can have at least one hole formed therein 52, as shown in FIG. 5, which provides a front view of the cap 46, and in particular, the radially inward portion 50 of the cap prior to assembling with the spacer block 26 of the endwinding blocking member 22. As shown in FIG. 5, the radially inward portion 50 of the cap 46 can include two holes 52. In one embodiment, the holes 52 can be in alignment with the transverse holes 40 formed on the outer surface 42 of the spacer body 28 of the spacer block 26 (FIGS. 3A and 3B). In one embodiment, the holes 52 can be in alignment with the transverse holes 40 formed on the outer surface 44 of both the first outboard end region 36 and the second outboard end region 38 of the spacer body 28 of the spacer block 26 depicted in FIG. 4. Referring back again to FIGS. 3A and 3B, the cap 46 can have at least one end 54 extending beyond a periphery of the radially outboard end 32 of the spacer block 26. In this manner, this end 54 of the cap 46 can overlap and hang on an adjacent endwinding upon radial placement of the endwinding blocking member 22.

The cap 46 can include a semi-flexible, durable sheet of material. In one embodiment, this sheet of material can include a polymer sheet. Examples of polymer sheets that are suitable for use as the cap 46 can include, but are not limited to, NOMEX aramid paper, NOMEX-polyester laminate, KEVLAR, KAPTON, polyester, fiber and any other flexible durable non-metallic material.

With the use of a semi-flexible, durable sheet of material including any of the aforementioned materials, the cap 46 can be configured to include a top part that covers at least a portion of a top surface 48 of the radially outboard end 32 of the spacer body 28 of the spacer block 26 and extends beyond a periphery of the radially outboard end to hang on an adjacent endwinding, and a radially inward portion 50 that is received in the slot 34 of the spacer body 28 of the spacer block 26. For example, this semi-flexible, durable sheet of material sheet can be folded over onto itself and bent at the fold to form the cap 46 including the top covering part and the radially inward portion 50.

In one embodiment, the folded sheet can be shaped to form an "L" shaped cap or a "T" shaped cap that allows the radially inward portion 50 to be fitted in the slot 34 of the spacer body 28 of the spacer block 26 to have a vertical engagement between the cap and the spacer block. In this manner, the top part of the cap covers at least a portion of a top surface 48 of the radially outboard end 32 of the spacer body 28 of the spacer block 26. It is understood that the at least one hole 52 in the radially inward portion 50 of the sheets can be formed by any of number of known techniques that include, but are not limited to, drilling or punching. To this extent, the at least one hole 52 in the radially inward portion 50 of the sheets can align with the at least one transverse hole in the spacer body 28 of the spacer block 26.

Further details of the "T" shaped cap and the "L" shaped cap, as well other configurations are described below in more detail with respect to FIGS. 7A-7C.

The endwinding blocking member 22 can further include a fastener 56 placed in the at least one transverse hole 40 of the spacer block 26 and the at least one hole 52 in the radially inward portion 50 of the cap 46. In this manner, the fastener 56 can secure the cap 46 with the spacer block 26 such that there is a vertical engagement between the spacer body 28 of the spacer block and the cap, and a horizontal engagement between the cap and an adjacent endwinding that the end 54 of the cap can overlap and hang on to.

The fastener 56 can be any mechanism that can secure the cap 46 with the spacer block 26 such that there is a vertical engagement between the spacer body 28 of the spacer block and the cap. In one embodiment, the fastener 56 can include one or more pins that can be inserted horizontally in the at least one transverse hole 40 of the spacer body 28 of the spacer block 26 and the at least one hole 52 in the radially inward portion 50 of the cap 46. In this manner, the pins can "lock" the spacer block 26 and the cap 46 together. As a result, the pins are captured once the endwinding blocking member 22 is inserted between the coils of the endwindings.

It is understood that a variety of different pins are suitable for use as the fastener 56 in the endwinding blocking member 22. For example, the pins can be threaded or straight. In one embodiment, the pins can be formed from a non-metallic material.

Other mechanisms are suitable for use as a fastener that can secure the cap 46 with the spacer block 26 via the hole(s) 40 in the spacer block and the hole(s) in the radially inward portion 50 of the cap 46. For example, the fastener 56 can include, but are not limited to, rivets.

Figure 6:
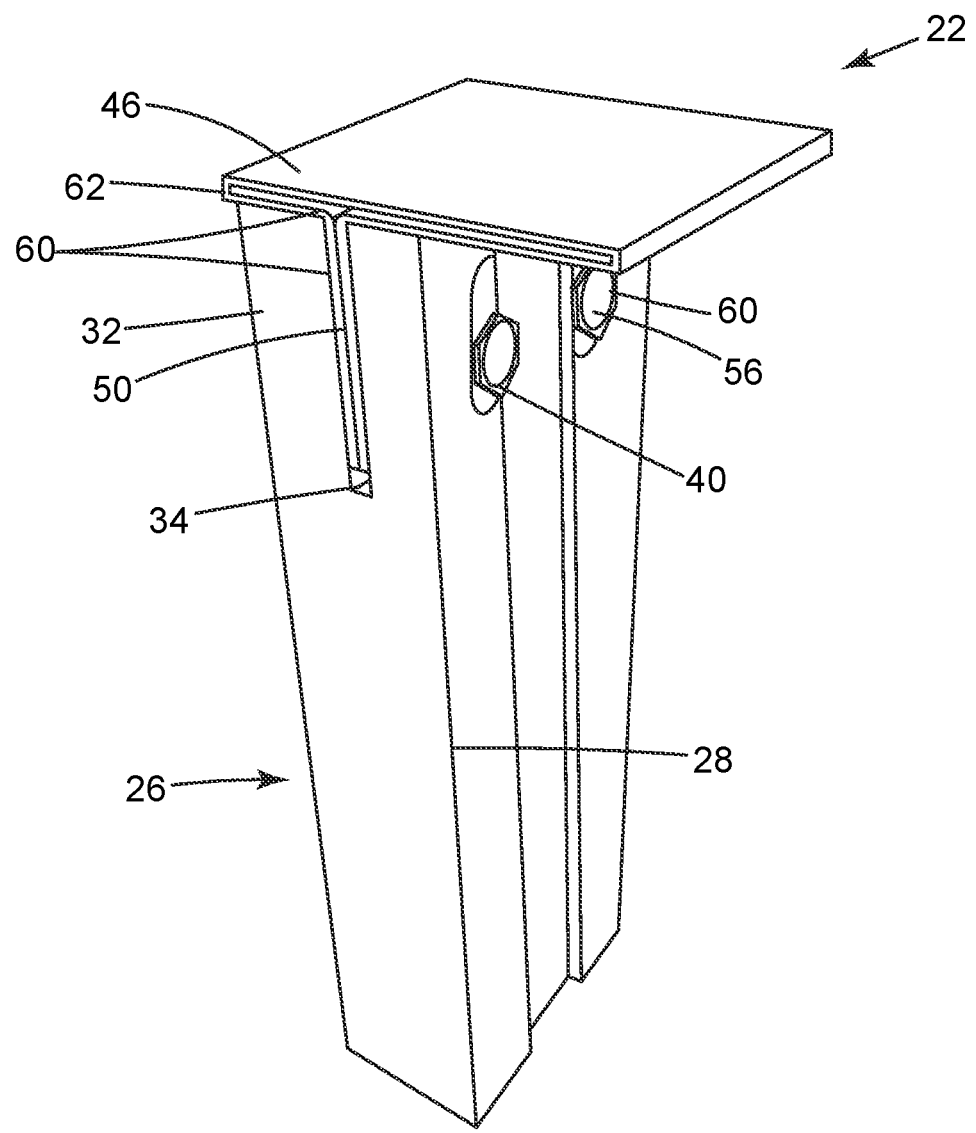
FIG. 6 shows a perspective view of an endwinding blocking member with a bonding material at various locations according to an embodiment of the present invention.

The vertical engagement between the spacer body 28 of the spacer block 26 and the cap 46 of the endwinding blocking member 22 can be further enhanced by the use of bonding material. FIG. 6 shows a perspective view of an endwinding blocking member 22 that can have a bonding material at a number of various locations. For example, as shown in FIG. 6, a bonding material 60 can be applied between a top surface 62 of the radially outboard end 32 of the spacer body 28 of the spacer block 26 and the cap 46. In one embodiment, the bonding material 60 can be applied to the fastener 56. In one embodiment, the bonding material 60 can be applied between the layers of the cap that result from folding the semi-flexible, durable sheet of material used to form the cap 46 such that it takes on one of the aforementioned shapes (e.g., a "T" shape or an "L" shape). It is understood that these embodiments of use of the bonding material 60 are only illustrative, and not meant to be limiting, as the endwinding blocking member 22 can be assembled dry without the use of the bonding material 60, with bonding material at one or more of the aforementioned locations, or with combinations of dry and bonded sections.

Any number of bonding material may be suitable for application to one or more of the locations that can include: 1.) between the top surface 62 of the radially outboard end 32 of the spacer body 28 of the spacer block 26 and the cap 46, 2.) to the fastener 56, and 3.) between the layers of the cap 46. The bonding material 60 can include any of a number of materials. For example, in one embodiment, the bonding material 60 can include an adhesive such as an epoxy filling compound (e.g., A50A233), or an epoxy adhesive (e.g., BARCO BOND).

FIGS. 7A-7C show schematics of endwinding blocking members according to various embodiments of the present invention. In particular, FIGS. 7A-7C show endwinding blocking members with different cap figurations. For example, FIG. 7A shows an endwinding blocking member 64 with the cap 46 having a single bend such that it forms a "long" cap with an "L" shape. As shown in FIG. 7A, the "long" shape cap 46 can cover a portion of the top surface 62 of the radially outboard end 32 of the spacer body 28 of the spacer block 26. In one embodiment, the "long" shaped cap 46 can comprise a first end 66 that extends beyond a periphery of the top surface 62 of the radially outboard end 32 of the spacer body 28 of the spacer block 26 towards an adjacent endwinding (not depicted).

FIG. 7B shows an endwinding blocking member 68 with the cap 46 having a "T" shape that can include a symmetric "T" shape. As shown in FIG. 7B, the "T" shaped cap 46 can cover all of the top surface 62 of the radially outboard end 32 of the spacer body 28 of the spacer block 26. In one embodiment, the "T" shaped cap 46 can comprise a first end 70 that extends beyond a periphery of the top surface 62 of the radially outboard end 32 of the spacer body 28 of the spacer block 26 towards a first adjacent endwinding (not depicted), and a second end 72 that extends beyond a periphery of an opposing end of the top surface of the radially outboard end of the spacer body of the spacer block towards a second adjacent endwinding (not depicted), such that the spacer block will separate the first adjacent endwinding from the second adjacent endwinding.

FIG. 7C shows an endwinding blocking member 74 with a "dual" cap. In one embodiment, the "dual" cap can comprise to two "long" caps or "L" shaped caps. As shown in FIG. 7C, the "dual" shaped cap 46 can comprise a first cap 76 that covers a first portion 78 of the top surface 62 of the radially outboard end 32 of the spacer body 28 of the spacer block 26, and a second cap 80 that covers a second portion 82 of the top surface of the radially outboard end 32 of the spacer body 28 of the spacer block 26. To this extent, there is no overlap of coverage of the top surface 62 of the first portion 78 and the second portion 82 of the radially outboard end 32 by the first cap 76 and the second cap 80.

In this embodiment, it is understood that both the first cap 76 and the second cap 80 each have a radially inward portion with at least one hole formed therein that is received in the slot of the spacer body 28 of the spacer block 26. With this configuration, the radially inward portion of both the first cap 76 and the second cap 80 each have a cap facing side 84 and a spacer block facing side 86. To this extent, the cap facing side 84 of the radially inward portion of the first cap 76 abuts the cap facing side 84 of the radially inward portion of the second cap 80. In addition, the spacer block facing side 86 of the radially inward portion of both the first cap 76 and the second cap 80 each abut with an opposing inner wall of the slot. In this manner, the at least one hole of the radially inward portion of both the first cap 76 and the second cap 80 are in alignment with the at least one transverse hole formed on the outer surface of the spacer body 28 of the spacer block 26. With this configuration shown in FIG. 7C, the first cap 76 and the second cap 80 cover all of the top surface 62 of the radially outboard end 32 of the spacer body of the spacer block.

EXAMPLES

The following provides particular examples of endwinding blocking members with retention mechanism formed according to embodiments described herein.

Example 1

In this example, an endwinding blocking member with a "dual" cap configuration was produced. In this example, two caps formed of NOMEX were inserted into a slot machined in a glass-based blocking. Each of the caps included a long bended section extending out from the slot and along a top surface of the blocking in opposing directions and extending beyond the periphery of the top surface. The portion of the caps in the slots each had two holes aligned with two transverse holes in the blocking. Pins were inserted into each of the holes in the blocking and the corresponding aligned holes in the caps, locking the caps to the blocking. After formation, the endwinding blocking member with the "dual" cap configuration underwent a series of tests to demonstrate the holding power of the "dual" cap. These tests included pull tests in vertical loading to simulate assembly, hammer tests to establish ability to withstand vertical hammer blows, hammer and vertical pull tests establishing the impact of a hammer on the strength of attachment of the dual cap and a "loose coil" test to confirm rigidity of the cap to hold the blocking member in position when there is excess clearance between the blocking and the coil. The tests showed that the "dual" cap broke around 180 in-lbf (180 lbs×1 in) before the pins broke, withstood 40 lbs, and that it slipped out of the testing structure before shearing at approximately (~) 55 lbs with minor deformation to the holes due to the pins.

Example 2

In this example, a bonding material was applied to an endwinding blocking member with an "L" shaped cap as described herein. In this example, the bonding material was applied to the "L" shaped cap, and between the "L" shaped cap and the blocking member. In this example, the bonding material that was applied included an epoxy filling compound (A50A233). The endwinding blocking member with the "L" shaped cap was subjected to the same testing described in Example 1. The tests showed that the "L" shaped cap with the epoxy filling compound on the cap experienced peak separation force at 85 lbf, while the configuration with the epoxy filling compound on the cap and the block showed separation starting at ~20 lbf, full separation at ~75 lbf, and peak separation force at ~185 lbf.

Example 3

In this example, the epoxy filling compound was applied to an endwinding blocking member with a "T" shaped cap as described herein. In this example, the epoxy filling compound was applied to the "T" shaped cap, and between the "T" shaped cap and the blocking member. The endwinding blocking member with the "T" shaped cap was subjected to the same testing described in Example 1. The tests showed that the "T" shaped cap with the epoxy filling compound on the cap started experiencing separation at ~10 lbf with peak separation force occurring at 70 lbf, while the configuration with the epoxy filling compound on the cap and the block showed separation starting at ~20 lbf, full separation at ~60 lbf, and peak separation force at ~115 lbf.

Example 4

In this example, the epoxy filling compound was applied to an endwinding blocking member with a "dual" cap configuration as described herein. In this example, the epoxy filling compound was applied to the "dual" cap configuration, and between the "dual" caps and the blocking member. The endwinding blocking member with the "dual" caps was subjected to the same testing described in Example 1. The tests showed that the "dual" cap configuration with the epoxy filling compound on the cap started experiencing separation at ~10 lbs with peak separation force occurring at 110 lbs, while the configuration with the epoxy filling compound on the cap and the block showed separation starting at ~20 lbs, full separation at ~60 lbs, and peak separation force at ~80 lbs.

Example 5

In this example, a bonding material that included BARCO BOND was applied to the "T" shaped cap, and between the "T" shaped cap and the blocking member. The endwinding blocking member with the "T" shaped cap was subjected to the same testing described in Example 1. The tests showed that the "T" shaped cap with BARCO BOND on the cap experienced separation starting at 15 lbs and peak separation force at 85 lbs, while the configuration with BARCO BOND on the cap and the block showed separation starting at ~20 lbs, full separation at ~50 lbs, and peak separation force at ~140 lbs.

Example 6

In this example, the BARCO BOND was applied to the "L" shaped cap, and between the "L" shaped cap and the blocking member. The endwinding blocking member with the "L" shaped cap was subjected to the same testing described in Example 1. The tests showed that the "L" shaped cap with BARCO BOND on the cap experienced peak separation force at 140 lbs, while the configuration with BARCO BOND on the cap and the block showed separation starting at ~15 lbs, full separation at ~40 lbs, and peak separation force at ~150 lbs.

Example 7

In this example, the BARCO BOND was applied to the "dual" cap configuration, and between the "dual" caps and the blocking member. The endwinding blocking member with the "dual" configuration cap was subjected to the same testing described in Example 1. The tests showed that the "dual" cap configuration with BARCO BOND on the caps experienced separation starting at 10 lbs and peak separation force at 100 lbs, while the configuration with BARCO BOND on the caps and the block showed separation starting at ~10 lbs, full separation at ~30 lbs, and peak separation force at ~180 lbs.

Comparative Example 1

In this example, an endwinding blocking member with a conventional retention mechanism comprising the use of rivets to affix the cap to the top of the blocking underwent the same tests described in Example 1. In this example, the tests showed that the cap held to the top of the blocking with rivets broke at around 200 in-lbf (135 lbs×1.5 in) with the rivets bent before shearing. In addition, the cap held to the top of the blocking with rivets sheared with 10 hammer blows, with two hammer blows causing shearing at 65 in-lbf (85 lbs×¾ in). This example also showed that the cap with rivet configuration also sheared around 45 lbs in the vertical test.

These testing results show that the various retention mechanisms described herein for use in holding the endwinding blocking have significant (2×-3×) increase in cap strength than that associated with the cap that utilizes rivets to affix the cap to the top of the blocking. For example, the retention mechanisms of the various embodiments have two times the vertical tear out strength than that of the cap and rivet configuration. Additionally, the retention mechanisms of the various embodiments showed no noticeable damage from hammer tests in contrast to the damage to the rivets that showed in the test performed on the cap and rivet configuration.

From the description of the illustrated embodiments and the examples, it is evident that the subject disclosure sets forth an endwinding blocking member with a retention mechanism that overcomes the drawbacks associated with the existing retention mechanisms used with the blocking. In particular, the various embodiments utilize a semi-flexible, durable sheet of material that is affixed within a slot formed in the blocking, that extends out from the slot and over a portion of a top surface of the blocking, where it is pinched between the coils and insulation of the retaining ring. This semi-flexible, durable sheet of material, referred to as a cap, can be folded to take on a shape that fits in the slot such that there is at least one end that can extend beyond a periphery of the top surface of the blocking towards the endwinding coils. The shape of the sheet of material can include a "T" shape or an "L" shape. The portion of the cap that is inserted into the slot can have at least one hole that aligns with at least one transverse hole formed on an outer surface of the blocking that extends in a perpendicular direction towards the slot.

A fastener, such as, for example, a pin, is placed in the at least one transverse hole of the blocking and the at least one hole in the portion of the cap in the slot, securing the cap with the blocking. To this extent, there is a vertical engagement between the blocking and the cap, and a horizontal engagement block between the cap and the endwindings. This vertical engagement and horizontal engagement lock the blocking, the cap, and the fastener together. As a result, the contact area of the cap to retention can be significantly increased, thus increasing the tear load to pull the cap out. Further, affixing the cap within the slot, as opposed to the top surface of the blocking, makes the design of the various embodiments less prone to becoming easily damaged during assembly. The retention mechanism of the endwinding blocking member can be enhanced by applying a bonding material such as an adhesive to one or more locations that can include in the semi-flexible, durable sheet of material used to form the cap, between the cap and the blocking and on the fastener.

There are several technical effects associated with the various embodiments. First, the retention mechanism of the endwinding blocking member of the various embodiments used to hold in place the blocking deployed in a generator rotor is much more durable against hammer blows or any impact on the top of the blocking which can happen during installation. Second, the retention mechanism of the various embodiments has a higher shear/tear strength from lateral loads seen in service of the generator rotor. Third, the assembly of the retention mechanism of the various embodiments can be made of entirely non-metallic components which is beneficial as any loose metallic components can cause electrical shorting in a generator field winding. As a result of these benefits, which are apparent in comparison to retention mechanisms that use rivets, the solution offered by the various embodiments is cost effective and robust to assembly and operational loading.

Other technical effects of the various embodiments of the present invention include a cost effective design. As a result of this design, the cycle time to procure parts to form the endwinding blocking member described herein and install in a generator rotor will be short. With the endwinding blocking member of the various embodiments less prone to becoming damaged due to a more robust retention mechanism, the likelihood of it becoming loose is diminished. As a result, there will be less operational issues associated with the service of the generator rotor. Further, because there is less complexity associated with the retention mechanism, the endwinding blocking member can be replaced without much difficulty. As a result, the service of the generator rotor can be performed directly by the operators of the rotor, obviating the need to rely on special service vendors to perform the work. In addition, another advantage associated with the retention mechanism of the endwinding blocking member that is due to its minimal complexity is that the generator rotor can easily be modified or retrofitted according to any of the various embodiments described herein.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. For example, parts, components, steps and aspects from different embodiments may be combined or suitable for use in other embodiments even though not described in the disclosure or depicted in the figures. Therefore, since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below. For example, references to "one embodiment" of the present invention are not intended to be interpreted as excluding the existence of additional embodiments that also incorporate the recited features.

In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. The terms "substantially," "generally," and "about" indicate conditions within reasonably achievable manufacturing and assembly tolerances, relative to ideal desired conditions suitable for achieving the functional purpose of a component or assembly. Further, the limitations of the following claims are not written in means-plus-function format and are not intended to be interpreted as such, unless and until such claim limitations expressly use the phrase "means for" followed by a statement of function void of further structure.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings, such terms are intended to be inclusive in a manner similar to the term "comprising" as "comprising" is interpreted when employed as a transitional word in a claim. That is, unless explicitly stated to the contrary, embodiments "comprising," "including," or "having" an element or a plurality of elements having a particular property may include additional such elements not having that property.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

A rotor endwinding blocking member, comprising: a spacer block adapted for radial placement between rotor endwindings disposed on a generator rotor, the spacer block including a spacer body having a radially inboard end, a radially outboard end, a slot extending radially inward a predetermined distance from the radially outboard end towards the radially inboard end, and at least one transverse hole formed on an outer surface of the spacer body, extending in a perpendicular direction towards the slot; a cap that covers at least a portion of a top surface of the radially outboard end of the spacer body of the spacer block, the cap having a radially inward portion received in the slot of the spacer body of the spacer block with at least one hole formed therein aligned with the at least one transverse hole formed on the outer surface of the spacer body of the spacer block, and at least one end extending beyond a periphery of the radially outboard end of the spacer body of the spacer block towards an adjacent endwinding; and a fastener placed in the at least one transverse hole of the spacer body of the spacer block and the at least one hole in the radially inward portion of the cap, securing the cap with the spacer body of the spacer block.

The rotor endwinding blocking member of the preceding clause, wherein the cap covers all of the top surface of the radially outboard end of the spacer body of the spacer block.

The rotor endwinding blocking member of any of the preceding clauses, wherein the cap comprises a first end extending beyond a periphery of the top surface of the radially outboard end of the spacer body of the spacer block towards a first adjacent endwinding and a second end extending beyond a periphery of an opposing end of the top surface of the radially outboard end of the spacer block towards a second adjacent endwinding, wherein the spacer block separates the first adjacent endwinding from the second adjacent endwinding.

The rotor endwinding blocking member of any of the preceding clauses, wherein the cap comprises a first cap that covers a first portion of the top surface of the radially outboard end of the spacer body of the spacer block and a second cap that covers a second portion of the top surface of the radially outboard end of the spacer body of the spacer block without any overlap of coverage of the first portion of the top surface of the radially outboard end by the first cap, both the first cap and the second cap each having a radially inward portion with at least one hole formed therein received in the slot of the spacer body of the spacer block, the radially inward portion of both the first cap and the second cap each having a cap facing side and a spacer block facing side, wherein the cap facing side of the radially inward portion of the first cap abuts the cap facing side of the radially inward portion of the second cap, and the spacer block facing side of the radially inward portion of both the first cap and the second cap each abutting with an opposing inner wall of the slot, wherein the at least one hole of the radially inward portion of both the first cap and the second cap are in alignment with the at least one transverse hole formed on the outer surface of the spacer body of the spacer block.

The rotor endwinding blocking member of any of the preceding clauses, wherein the first cap and the second cap cover all of the top surface of the radially outboard end of the spacer body of the spacer block.

The rotor endwinding blocking member of any of the preceding clauses, wherein the first cap comprises a first cap end portion extending beyond a periphery of the top surface of the radially outboard end of the spacer body of the spacer block in a direction towards a first adjacent endwinding, and the second cap comprises a second cap end portion extending beyond a periphery of the top surface of the radially outboard end of the spacer body of the spacer block in an opposing direction towards a second adjacent endwinding, wherein the spacer block separates the first adjacent endwinding from the second adjacent endwinding.

The rotor endwinding blocking member of any of the preceding clauses, wherein the slot forms a first outboard end region and a second outboard end region in the spacer body of the spacer block, the slot separating the first outboard end region from the second outboard end region.

The rotor endwinding blocking member of any of the preceding clauses, wherein the at least one transverse hole is formed on an outer surface of both the first outboard end region and the second outboard end region.

The rotor endwinding blocking member of any of the preceding clauses, wherein the cap comprises a polymer sheet.

The rotor endwinding blocking member of any of the preceding clauses, wherein the polymer sheet is folded over onto itself and bent at the fold to form the cap with the radially inward portion and the at least one end.

The rotor endwinding blocking member of any of the preceding clauses, wherein the folded sheet forms an "L" shape or a "T" shape.

The rotor endwinding blocking member of any of the preceding clauses, further comprising a bonding material on a surface of the polymer sheet securing the fold to maintain the form of the radially inward portion and the at least one end of the cap.

The rotor endwinding blocking member of any of the preceding clauses, wherein the fastener comprises a pin.

The rotor endwinding blocking member of any of the preceding clauses, further comprising a bonding material applied between a top surface of the radially outboard end of the spacer body of the spacer block and the cap.

The rotor endwinding blocking member of any of the preceding clauses, further comprising a bonding material applied to the fastener.

The rotor endwinding blocking member of any of the preceding clauses, further comprising a bonding material applied to one or more locations that include between a top surface of the radially outboard end of the spacer body of the spacer block and the cap, on the fastener, in the cap, and combinations thereof.

A generator rotor, comprising: a rotor body having a plurality of axially oriented slots extending radially outward from a center of the rotor body; a plurality of field windings disposed in the slots, wherein the plurality of field windings include longitudinally oriented central windings secured with the slots and turns of endwindings extending out unsecured from the slots; an arrangement of blocking members radially disposed between the turns of endwindings to restrain the endwindings from relative longitudinal movement, each blocking member including: a spacer block having a spacer body with a radially inboard end, a radially outboard end, a slot extending radially inward a predetermined distance from the radially outboard end towards the radially inboard end to form a first outboard end region and a second outboard end region, the slot separating the first outboard end region from the second outboard end region, and at least one transverse hole formed on a surface of both the first outboard end region and the second outboard end region, the at least one transverse hole of both the first outboard end region and the second outboard end region extending in a perpendicular direction towards the slot; a cap that covers at least a portion of a top surface of the radially outboard end of the spacer block, the cap having a radially inward portion received in the slot of the spacer block with at least one hole formed therein aligned with the at least one transverse hole formed on the outer surface of both the first outboard end region and the second outboard end region of the spacer block, and at least one end extending beyond a periphery of the top surface of the radially outboard end of the spacer block towards an adjacent endwinding; and a fastener placed in the at least one transverse hole of both the first outboard end region and the second outboard end region of the spacer block and the at least one hole in the radially inward portion of the cap, securing the cap with the spacer body of the spacer block, wherein there is a vertical engagement between the spacer body of the spacer block and the cap, and a horizontal engagement between the cap and the adjacent endwinding; and a retaining ring fitted over the arrangement of blocking members to restrain the endwindings from radial outward movement.

The generator rotor of the preceding clause, wherein the cap is an "L" shaped cap, a "T" shaped cap, or a dual cap having two "L" shaped caps.

A method of servicing a generator rotor having a rotor body with a plurality of axially oriented slots extending radially outward from a center of the rotor body and a plurality of field windings having longitudinally oriented central windings secured with the slots and turns of endwindings extending out unsecured from the slots, the method comprising: modifying or retrofitting the generator rotor with an arrangement of blocking members radially disposed between the turns of endwindings to restrain the endwindings from relative longitudinal movement, each blocking member including: a spacer block having a spacer body with a radially inboard end, a radially outboard end, a slot extending radially inward a predetermined distance from the radially outboard end towards the radially inboard end to form a first outboard end region and a second outboard end region, the slot separating the first outboard end region from the second outboard end region, and at least one transverse hole formed on a surface of both the first outboard end region and the second outboard end region, the at least one transverse hole of both the first outboard end region and the second outboard end region extending in a perpendicular direction towards the slot; a cap that covers at least a portion of a top surface of the radially outboard end of the spacer block, the cap having a radially inward portion received in the slot of the spacer block with at least one hole formed therein aligned with the at least one transverse hole formed on the outer surface of both the first outboard end region and the second outboard end region of the spacer block, and at least one end extending beyond a periphery of the top surface of the radially outboard end of the spacer block towards an adjacent endwinding; and a fastener placed in the at least one transverse hole of both the first outboard end region and the second outboard end region of the spacer block and the at least one hole in the radially inward portion of the cap, securing the cap with the spacer body of the spacer block, wherein there is a vertical engagement between the spacer body of the spacer block.

The method of the preceding clause, further comprising affixing the at least one end of the cap that extends beyond a periphery of the top surface of the radially outboard end of the spacer block for each blocking in the arrangement towards an adjacent endwinding, providing a horizontal engagement between the cap and the adjacent endwinding.

What is claimed is:

1. A rotor endwinding blocking member, comprising:
    a spacer block adapted for radial placement between rotor endwindings disposed on a generator rotor, the spacer block including a spacer body having a radially inboard end, a radially outboard end, a slot extending radially inward a predetermined distance from the radially outboard end towards the radially inboard end, and at least one transverse hole formed on an outer surface of the spacer body, extending in a perpendicular direction towards the slot;
    a cap that covers at least a portion of a top surface of the radially outboard end of the spacer body of the spacer block, the cap having a radially inward portion received in the slot of the spacer body of the spacer block with at least one hole formed therein aligned with the at least one transverse hole formed on the outer surface of the spacer body of the spacer block, and at least one end extending beyond a periphery of the radially outboard end of the spacer body of the spacer block towards an adjacent endwinding; and
    a fastener placed in the at least one transverse hole of the spacer body of the spacer block and the at least one hole in the radially inward portion of the cap, securing the cap with the spacer body of the spacer block.

2. The rotor endwinding blocking member of claim 1, wherein the cap covers all of the top surface of the radially outboard end of the spacer body of the spacer block.

3. The rotor endwinding blocking member of claim 2, wherein the cap comprises a first end extending beyond a periphery of the top surface of the radially outboard end of the spacer body of the spacer block towards a first adjacent endwinding and a second end extending beyond a periphery of an opposing end of the top surface of the radially outboard end of the spacer block towards a second adjacent endwinding, wherein the spacer block separates the first adjacent endwinding from the second adjacent endwinding.

4. The rotor endwinding blocking member of claim 1, wherein the cap comprises a first cap that covers a first portion of the top surface of the radially outboard end of the spacer body of the spacer block and a second cap that covers a second portion of the top surface of the radially outboard end of the spacer body of the spacer block without any overlap of coverage of the first portion of the top surface of the radially outboard end by the first cap, both the first cap and the second cap each having a radially inward portion with at least one hole formed therein received in the slot of the spacer body of the spacer block, the radially inward portion of both the first cap and the second cap each having a cap facing side and a spacer block facing side, wherein the cap facing side of the radially inward portion of the first cap abuts the cap facing side of the radially inward portion of the second cap, and the spacer block facing side of the radially inward portion of both the first cap and the second cap each abutting with an opposing inner wall of the slot, wherein the at least one hole of the radially inward portion of both the first cap and the second cap are in alignment with the at least one transverse hole formed on the outer surface of the spacer body of the spacer block.

5. The rotor endwinding blocking member of claim 4, wherein the first cap and the second cap cover all of the top surface of the radially outboard end of the spacer body of the spacer block.

6. The rotor endwinding blocking member of claim 4, wherein the first cap comprises a first cap end portion extending beyond a periphery of the top surface of the radially outboard end of the spacer body of the spacer block in a direction towards a first adjacent endwinding, and the second cap comprises a second cap end portion extending beyond a periphery of the top surface of the radially outboard end of the spacer body of the spacer block in an opposing direction towards a second adjacent endwinding, wherein the spacer block separates the first adjacent endwinding from the second adjacent endwinding.

7. The rotor endwinding blocking member of claim 1, wherein the slot forms a first outboard end region and a second outboard end region in the spacer body of the spacer block, the slot separating the first outboard end region from the second outboard end region.

8. The rotor endwinding blocking member of claim 7, wherein the at least one transverse hole is formed on an outer surface of both the first outboard end region and the second outboard end region.

9. The rotor endwinding blocking member of claim 1, wherein the cap comprises a polymer sheet.

10. The rotor endwinding blocking member of claim 9, wherein the polymer sheet is folded over onto itself and bent at the fold to form the cap with the radially inward portion and the at least one end.

11. The rotor endwinding blocking member of claim 10, wherein the folded sheet forms an "L" shape or a "T" shape.

12. The rotor endwinding blocking member of claim 10, further comprising a bonding material on a surface of the polymer sheet securing the fold to maintain the form of the radially inward portion and the at least one end of the cap.

13. The rotor endwinding blocking member of claim 1, wherein the fastener comprises a pin.

14. The rotor endwinding blocking member of claim 1, further comprising a bonding material applied between a top surface of the radially outboard end of the spacer body of the spacer block and the cap.

15. The rotor endwinding blocking member of claim 1, further comprising a bonding material applied to the fastener.

16. The rotor endwinding blocking member of claim 1, further comprising a bonding material applied to one or more locations that include between a top surface of the radially outboard end of the spacer body of the spacer block and the cap, on the fastener, in the cap, and combinations thereof.

17. A generator rotor, comprising:
  a rotor body having a plurality of axially oriented slots extending radially outward from a center of the rotor body;
  a plurality of field windings disposed in the slots, wherein the plurality of field windings include longitudinally oriented central windings secured with the slots and turns of endwindings extending out unsecured from the slots;
  an arrangement of blocking members radially disposed between the turns of endwindings to restrain the endwindings from relative longitudinal movement, each blocking member including:
    a spacer block having a spacer body with a radially inboard end, a radially outboard end, a slot extending radially inward a predetermined distance from the radially outboard end towards the radially inboard end to form a first outboard end region and a second outboard end region, the slot separating the first outboard end region from the second outboard end region, and at least one transverse hole formed on a surface of both the first outboard end region and the second outboard end region, the at least one transverse hole of both the first outboard end region and the second outboard end region extending in a perpendicular direction towards the slot;
    a cap that covers at least a portion of a top surface of the radially outboard end of the spacer block, the cap having a radially inward portion received in the slot of the spacer block with at least one hole formed therein aligned with the at least one transverse hole formed on the outer surface of both the first outboard end region and the second outboard end region of the spacer block, and at least one end extending beyond a periphery of the top surface of the radially outboard end of the spacer block towards an adjacent endwinding; and
    a fastener placed in the at least one transverse hole of both the first outboard end region and the second outboard end region of the spacer block and the at least one hole in the radially inward portion of the cap, securing the cap with the spacer body of the spacer block, wherein there is a vertical engagement between the spacer body of the spacer block and the cap, and a horizontal engagement between the cap and the adjacent endwinding; and
  a retaining ring fitted over the arrangement of blocking members to restrain the endwindings from radial outward movement.

18. The generator rotor of claim 17, wherein the cap is an "L" shaped cap, a "T" shaped cap, or a dual cap having two "L" shaped caps.

19. A method of servicing a generator rotor having a rotor body with a plurality of axially oriented slots extending radially outward from a center of the rotor body and a plurality of field windings having longitudinally oriented central windings secured with the slots and turns of endwindings extending out unsecured from the slots, the method comprising:

modifying or retrofitting the generator rotor with an arrangement of blocking members radially disposed between the turns of endwindings to restrain the endwindings from relative longitudinal movement, each blocking member including:

a spacer block having a spacer body with a radially inboard end, a radially outboard end, a slot extending radially inward a predetermined distance from the radially outboard end towards the radially inboard end to form a first outboard end region and a second outboard end region, the slot separating the first outboard end region from the second outboard end region, and at least one transverse hole formed on a surface of both the first outboard end region and the second outboard end region, the at least one transverse hole of both the first outboard end region and the second outboard end region extending in a perpendicular direction towards the slot;

a cap that covers at least a portion of a top surface of the radially outboard end of the spacer block, the cap having a radially inward portion received in the slot of the spacer block with at least one hole formed therein aligned with the at least one transverse hole formed on the outer surface of both the first outboard end region and the second outboard end region of the spacer block, and at least one end extending beyond a periphery of the top surface of the radially outboard end of the spacer block towards an adjacent endwinding; and a fastener placed in the at least one transverse hole of both the first outboard end region and the second outboard end region of the spacer block and the at least one hole in the radially inward portion of the cap, securing the cap with the spacer body of the spacer block, wherein there is a vertical engagement between the spacer body of the spacer block.

20. The method of claim 19, further comprising affixing the at least one end of the cap that extends beyond a periphery of the top surface of the radially outboard end of the spacer block for each blocking in the arrangement towards an adjacent endwinding, providing a horizontal engagement between the cap and the adjacent endwinding.

\* \* \* \* \*